United States Patent
Bradl et al.

(10) Patent No.: US 6,447,372 B1
(45) Date of Patent: Sep. 10, 2002

(54) POLISHING AGENT FOR SEMICONDUCTOR SUBSTRATES

(75) Inventors: Stephan Bradl, Köfering; Olaf Heitzsch, Coswig, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/491,296

(22) Filed: Jan. 25, 2000

Related U.S. Application Data

(63) Continuation of application No. PCT/DE98/02050, filed on Jul. 21, 1998.

(51) Int. Cl.⁷ ................................................. B24B 1/00
(52) U.S. Cl. ............................... 451/41; 451/60; 106/3; 51/308
(58) Field of Search .................. 51/308–309; 106/3, 106/286.8; 451/41, 28, 60; 252/79.1; 438/693; 216/89, 87

(56) References Cited

U.S. PATENT DOCUMENTS

| | | | |
|---|---|---|---|
| 3,252,917 A | * 5/1966 | Mindick et al. | 516/80 |
| 3,620,978 A | * 11/1971 | Moore | 516/80 |
| 3,691,089 A | * 9/1972 | Janzon et al. | 516/80 |
| 3,956,171 A | * 5/1976 | Moore et al. | 516/80 |
| 4,336,234 A | * 6/1982 | Leutner et al. | 516/80 |
| 5,064,683 A | * 11/1991 | Poon et al. | 427/39 |
| 5,264,010 A | * 11/1993 | Brancaleoni et al. | 51/308 |
| 5,382,272 A | 1/1995 | Cook et al. | |
| 5,449,314 A | * 9/1995 | Meikle et al. | 451/41 |
| 5,795,495 A | * 8/1998 | Meikle | 216/88 |
| 5,954,997 A | * 9/1999 | Kaufman et al. | 252/79.1 |

FOREIGN PATENT DOCUMENTS

| | | |
|---|---|---|
| DE | 19520614 C1 | 11/1996 |
| EP | 0745656 A1 | 12/1996 |

OTHER PUBLICATIONS

Japanese Patent Abstract No. 09162144 (Murota).
XP–002088822, Database INSPEC/IEE, Inspection No. 5406790, Schaffer W. J. et al., dated Jul. 1996.
Published International Application No. 97/13272 (Sahota), dated Apr. 10, 1997.
W.E. Armstrong et al.: "A Scanning Electron Microscope Investigation of Glass Flow in MOS Integrated Circuit Fabrication", *J. Electrochem. Soc.: Solid State Science and Technology*, vol. 121, No. 2, Feb. 1974, pp. 307–310.
Naoyuki Nagasima et al.: "Interaction between Phosphosilicate Glass Films and Water", *J. Electrochem. Soc.: Solid State Science and Technology*, vol. 121, No. 3, Mar. 1974, pp. 434–438.
G.L. Schnable et al.: "Passivation Coatings on Silicon Devices", *J. Electrochem. Soc.: Solid State Science and Technology*, vol. 122, No. 8, Aug. 1975–pp. 1092–1103.
A.C. Adams et al.: "Planarization of Phosphorus–Doped Silicon Dioxide", *J. Electrochem. Soc.: Solid State Science and Technology*, vol. 128, No. 2, Feb. 1981, pp. 423–429.
D.F. Downey et al.: "Activation and Process Characteristics of Infrared Rapid Isothermal and Furnace Annealing Techniques", *Solid State Technology*, Sep. 1982, pp. 87–93.

\* cited by examiner

*Primary Examiner*—George Nguyen
(74) *Attorney, Agent, or Firm*—Laurence A. Greenberg; Werner H. Stemer; Gregory L. Mayback

(57) ABSTRACT

The polishing agent of the invention has polishing grains suspended in a solution. The polishing grains consist essentially of a first substance with a glass transition temperature $T_G$, and the polishing grains contain a dopant. The concentration of the dopant is set so that the glass transition temperature $T_G'$ of the doped substance is lower than the glass transition temperature $T_G$ of the undoped first substance. The polishing agent is advantageously used for the microscratch-free planarization of a semiconductor substrate or of layers applied on it.

8 Claims, 1 Drawing Sheet

POLISHING AGENT FOR SEMICONDUCTOR SUBSTRATES

CROSS-REFERENCE TO RELATED APPLICATION

This is a continuation of copending International Application PCT/DE98/02050, filed Jul. 21, 1998, which designated the United States.

BACKGROUND OF THE INVENTION

Field of the Invention

The invention lies in the semiconductor technology field. More specifically, the invention relates to a polishing agent with a solution and with polishing grains suspended in the solution, as well as to the use of the polishing agent for planarizing a semiconductor substrate.

One planarizing method used in sub-0.5 µm technology is chemical mechanical polishing (CMP). The process may be considered either as chemically assisted mechanical polishing or as wet chemical etching assisted by mechanical action. Besides the polishing grains (abrasives), the polishing agent also contains active chemical additives. The chemical additives promote selective erosion of specific layers on the semiconductor wafers. They are tailored to the layer material to be eroded. The polishing grains consist of silicon dioxide ($SiO_2$), aluminum oxide ($Al_2O_3$), or cerium oxide ($Ce_2O_3$).

It has been found that, when hard polishing grains are used for the processing of comparatively soft layers, microscratches can be created. In order to solve this problem, it is known to vary the hardness of the polishing grains by using the substances, of which they consist, in a softer phase.

For example, aluminum oxide ($Al_2O_3$) has a hard hexagonal phase (corundum) and a soft cubic y-phase (alumina). There are actually eight different known polymorphs of silicon dioxide ($SiO_2$): quartz, cristobalite, tridymite, coesite, stishovite, keatite, melanophlogite, and fibrous silicon dioxide. All these materials each have a defined hardness and density. The possibilities for varying the hardness of the polishing grains used are restricted by the selection of polymorphs available. This does not allow a continuous spectrum of properties. The grinding process can hence be matched to the hardness and composition of the material to be planarized only within limitations.

SUMMARY OF THE INVENTION

The object of the invention is to provide a polishing agent for semiconductor substrates, which overcomes the above-noted deficiencies and disadvantages of the prior art devices and methods of this kind, and which allows polishing at the highest possible erosion rate, yet avoids the creation of microscratches.

With the above and other objects in view there is provided, in accordance with the invention, a polishing agent, comprising:

a solution and polishing grains suspended in the solution;

the polishing grains consisting essentially of a first substance with a given glass transition temperature $T_G$;

a dopant in the polishing grains to form a doped substance;

the dopant having a concentration set to lower a glass transition temperature $T_G'$ of the doped substance to below the given glass transition temperature $T_G$ of the undoped first substance.

The invention hence proposes, through the controlled addition of one or more materials, to modify the substance, of which the polishing grains consist, in such a way that its glass transition temperature is lowered. As a consequence, the substance becomes softer.

For particles in the size range of abrasives, with a diameter of between 50 and 500 nm, a macroscopic value such as hardness can no longer be meaningfully used. Nevertheless, it has been shown that the hardness relevant to the grinding process depends monotonically on the glass transition temperature.

It is particularly expedient to limit the addition of the dopants so as to avoid any phase transition of the first substance. In this case, the addition of the dopant merely causes a slight structural modification of the first substance, but not a phase transition.

The addition of the dopant causes the long-range order and therefore the crystal structure to be weakened. By varying the dopant concentration, the degree of hardness of the polishing grains can in this way be adjusted precisely. Transition to the vitreous state is not necessary for this softening.

Even though transition to the vitreous state is not necessary for the desired softening of the polishing grains, the glass transition temperature nevertheless constitutes a criterion which can be used to find suitable soft compositions. In this context, the term glass transition temperature refers to the ideal glass transition temperature, i.e. the temperature at which a transition to the vitreous state would take place with infinitely slow cooling. In terms of thermodynamics, this temperature $T_G$ is wherein the entropy $S_{glass}$ (T) is higher than the entropy $S_{crystal}$ (T) at that level. According to the invention, however, it is not the glass transition per se that matters, since even a crystal structure modified in the manner described above can meet the requirement of being softer in a controlled way.

An upper limit for the addition of dopants is formed by those concentrations at which there is a risk of phase separation (efflorescence) or inverted viscosity (i.e. system A doped with system B converts to system B doped with system A).

In accordance with an added feature of the invention, the concentration of the dopant is set to lower the glass transition temperature $T_G'$ of the doped substance by at least 10% relative to the given glass transition temperature $T_G$ of the undoped first substance.

In accordance with an additional feature of the invention, the first substance is an oxide of a metal or a semimetal.

In accordance with another feature of the invention, the first substance is selected from the group consisting of $SiO_2$, $Al_2O_3$, and $Ce_2O_3$. The erosion behavior of these substances is known, and so is their interaction with the chemical additives contained in the polishing agent.

In accordance with a further feature of the invention, the dopant contains at least one element selected from the group consisting of B, P, As, Sb, Si, and Al. Since, apart from its being weakened, the crystal structure is preserved when the dopant(s) is added, the interaction in the total system, consisting of the layer to be processed, the solvent and the additives which it contains and the polishing grains, is changed only to the extent that the creation of microscratches is prevented by the softening of the polishing grains. Adjustment of the other parameters of the planar polishing process can be avoided. Complete new development of the polishing process is therefore unnecessary. For a correspondingly produced polishing agent, there is therefore a high potential for use in a chemical mechanical polishing process.

In accordance with again a further feature of the invention, the diameter of the polishing grains is from 50 to 500 nm.

Owing to technical, that is to say physical and chemical constraints, the selection of suitable substances as the first substance for the abrasive is restricted. The addition of one or more dopants makes it possible to tailor the hardness of the abrasive to the respective substrate to be polished, without it being necessary to change the abrasive.

The above-described polishing agents can be used for the microscratch-free planarization of semiconductor substrates or of layers applied on them. With the above and other objects in view there is provided, therefore, in accordance with the invention, a planarizing method, which comprises the following method steps:

providing a polishing agent as described above; and planarizing a surface of a semiconductor substrate or of layers applied on the semiconductor substrate substantially without microscratches by polishing the surface with the above-described polishing agent.

In accordance with a concomitant feature of the invention, a first substance is used with a hardness such that, when the surface is polished with the first substance in the undoped state, microscratches are created in the surface, and the concentration of the dopant is chosen high enough that no microscratches are created in the surface on the semiconductor substrate during the planarizing polishing with the doped substance.

With this special use, the hardness of the polishing agent can be tailored precisely to the hardness and composition of the semiconductor substrate to be processed.

Other features which are considered as characteristic for the invention are set forth in the appended claims.

Although the invention is illustrated and described herein as embodied in a polishing agent for semiconductor substrates, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
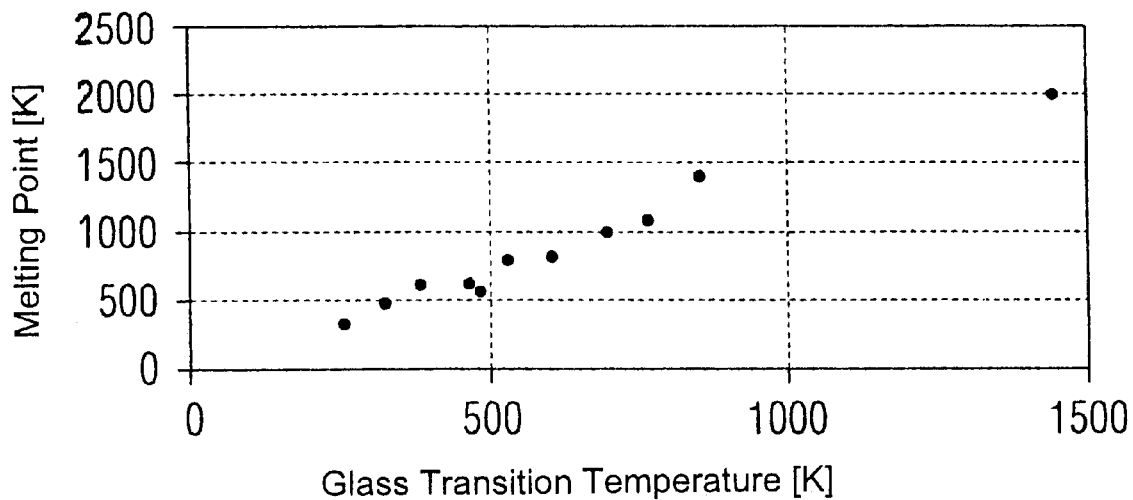
FIG. 1 is a graph showing the relationship between glass transition temperature and melting point.

Referring now to the figures of the drawing in detail and first, particularly, to FIG. 1 thereof, there is seen a relationship between glass transition temperature and melting point that can be derived from the following Table 1:

TABLE 1

|  | Glass Transition Temperature [K] | Melting Point [K] |
| --- | --- | --- |
| S | 246 | 342 |
| Se | 318 | 490 |
| $As_2Te_3$ | 379 | 633 |
| $ZnCl_2$ | 380 | 590 |
| $As_2Se_3$ | 468 | 633 |
| $As_2S_3$ | 478 | 573 |
| $B_2O_3$ | 530 | 793 |
| $BeF_2$ | 598 | 821 |
| GeSe | 695 | 980 |
| $GeS_2$ | 765 | 1073 |
| $GeO_2$ | 853 | 1388 |
| $SiO_2$ | 1453 | 2003 |

FIG. 1 displays a monotonic increase in melting point with the glass transition temperature for the substances described.

Figure 2:
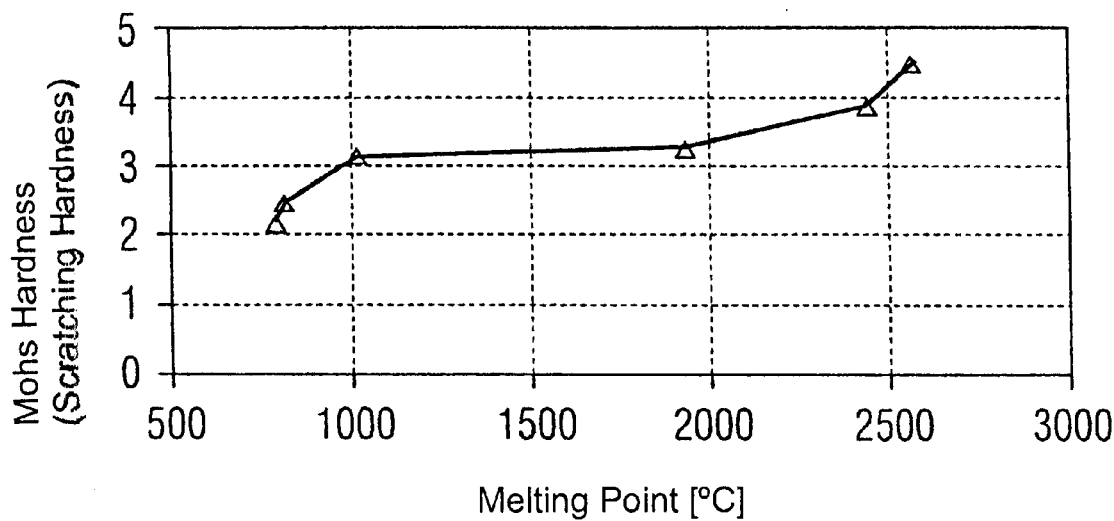
FIG. 2 is a graph showing the relationship between melting point and the hardness of the polishing grains.

FIG. 2 represents the Mohs scratching hardness as a function of the melting point. The values are taken from Table 2 below:

TABLE 2

|  | Melting Point [K] | Mohs Hardness (scratching hardness) |
| --- | --- | --- |
| KCl | 770 | 2.2 |
| NaCl | 800 | 2.5 |
| NaF | 992 | 3.2 |
| BaO | 1925 | 3.3 |
| SrO | 2430 | 3.9 |
| CaO | 2570 | 4.5 |
| MgO | 2642 | 6.5 |

The relationship represented in FIG. 2 between melting point and scratching hardness shows a monotonic increase in scratching hardness with the increase in the melting point.

Accordingly, this gives a monotonic increase in hardness with rising glass transition temperature as well.

The lowering of the glass transition temperature through the addition of dopants is given, with reference to the example of PSG (phosphorus silicate glass) and BPSG (borophosphorus silicate glass), according to the following Table 3:

TABLE 3

|  | Composition | | Glass Transition |
| --- | --- | --- | --- |
|  | Mass % $B_2O_3$ | Mass % $P_2O_5$ | Temperature $T_G$ |
| PSG |  |  | 800 |
| BPSG-A | 11.9 | 4.2 | 645 |
| BSG | 18.9 |  | 515 |
| PSG |  | 7.5 | 750 |
| PSG |  | 6.9 | 725 |

The preparation of the colloidal systems suitable for the polishing agent will be explained below with reference to the example of $SiO_2$ as the first substance of the polishing grains. It is, of course, equally possible to carry out these processes with other first substances and other dopants.

It is possible to produce colloidal $SiO_2$ with a dopant using various methods.

In a pyrogenic process, a $SiCl_4/AlCl_3$ mixture is reacted in an oxyhydrogen gas flame and the reaction products are hydrolyzed. In the mixed oxides created by this process, aluminum oxide $Al_2O_3$ is incorporated as dopant in the primary structure of the host oxide silicon dioxide $SiO_2$. The incorporation of other dopants, for example boron or phosphorus, is correspondingly possible through the reaction of $SiCl_4$ with $BCl_3$ or $PCl_5$.

Another possible way of producing colloidal $SiO_2$ involves the dealkalisation of sodium orthosilicate solution. In this process, orthosilicic acid molecules condense to form spherical $SiO_2$ aggregates with a diameter of from 50 to 500 nm. If, during the condensation, the dopants are added in a compound such as $(NH_4)_2HPO_4$ or $H_3BO_4$ with a corresponding ratio and pH, it is likewise possible to incorporate the dopant into the primary structure of the host oxide.

We claim:

1. A polishing agent, comprising:
    a solution and polishing grains suspended in said solution;
    said polishing grains consisting essentially of a first substance with a given glass transition temperature $T_G$;
    a dopant in said polishing grains to form a doped substance;
    said dopant having a concentration set to lower a glass transition temperature $T_G'$ of the doped substance to below the given glass transition temperature $T_G$ of the undoped first substance.

2. The polishing agent according to claim 1, wherein the concentration of said dopant is set to lower the glass transition temperature $T_G'$ of the doped substance by at least 10% relative to the given glass transition temperature $T_G$ of the undoped first substance.

3. The polishing agent according to claim 1, wherein said first substance is an oxide selected from the group consisting of a metal oxide and a semimetal oxide.

4. The polishing agent according to claim 1, wherein said first substance is selected from the group consisting of $SiO_2$, $Al_2O_3$, and $Ce_2O_3$.

5. The polishing agent according to claim 1, wherein said dopant contains at least one element selected from the group consisting of B, P, As, Sb, Si, and Al.

6. The polishing agent according to claim 1, wherein a mean diameter of said polishing grains is from 50 to 500 nm.

7. A planarizing method, which comprises:
    providing a polishing agent according to claim 1; and
    planarizing a surface of a semiconductor substrate or of layers applied on the semiconductor substrate substantially without microscratches by polishing the surface with the polishing agent according to claim 1.

8. The method according to claim 7, wherein the providing step comprises using a first substance with a hardness such that, when the surface is polished with the first substance in the undoped state, microscratches are created in the surface, and selecting a concentration of the dopant to be high enough such that no microscratches are created in the surface on the semiconductor substrate in the planarizing step.

* * * * *

UNITED STATES PATENT AND TRADEMARK OFFICE
CERTIFICATE OF CORRECTION

PATENT NO. : 6,447,372 B1
DATED : September 10, 2002
INVENTOR(S) : Stephan Bradl et al.

It is certified that error appears in the above-identified patent and that said Letters Patent is hereby corrected as shown below:

Title page,
Item [30], should read as follows:
-- Foreign Application Priority Data
Jul. 25, 1997     (DE) ……………….. 197 32 121.6 --

Signed and Sealed this

Twenty-ninth Day of July, 2003

JAMES E. ROGAN
*Director of the United States Patent and Trademark Office*